March 16, 1943.    G. V. MARIANI    2,313,954
BEVERAGE DISPENSING DEVICE
Filed April 2, 1940    2 Sheets-Sheet 1

INVENTOR.
GEORGE V. MARIANI
BY
Walter W. Burns
ATTORNEYS.

March 16, 1943. G. V. MARIANI 2,313,954
BEVERAGE DISPENSING DEVICE
Filed April 2, 1940 2 Sheets-Sheet 2
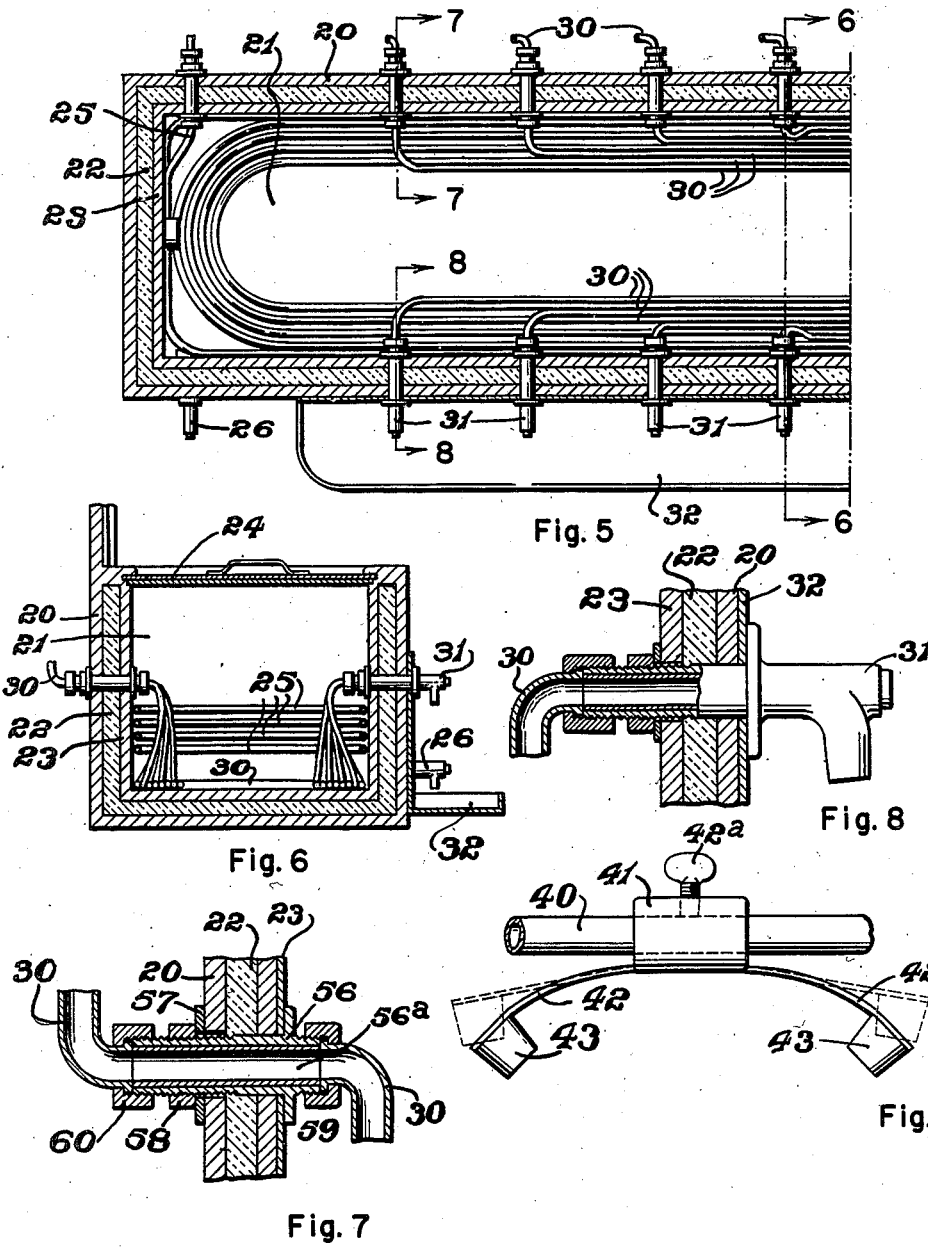
INVENTOR.
GEORGE V. MARIANI
BY
Walter W. Burns
ATTORNEYS.

Patented Mar. 16, 1943

2,313,954

UNITED STATES PATENT OFFICE 2,313,954

BEVERAGE DISPENSING DEVICE

George V. Mariani, San Antonio, Tex.

Application April 2, 1940, Serial No. 327,498

3 Claims. (Cl. 225—40)

This invention relates to liquid dispensing apparatus and has particular relation and applicability to those constructions intended for dispensing beverages.

It is well known that some beverages such as wine, age better in wooden containers. To bring about this result, wines are kept in wooden, usually oak, kegs or barrels and when practical to do so are shiped in wooden containers if they are not to be, at once, emptied.

In dispensing wines, it is not usually possible to have, for example, eight or more large kegs of the same number of wines, from which the wines are dispensed in small quantities. To avoid the necessity of having on hand a large number of large kegs or barrels from which the several kinds of beverage are to be drawn, and yet have the wine kept in and dispensed from the wood, is an important object of this invention.

Another object of the invention is the provision of an improved beverage dispensing apparatus.

A further object of the invention is the provision of a dispensing apparatus wherein is provided a dispensing means, a cooling means, a storage means and a feeding means, all coordinated and coacting in a manner to provide a complete apparatus wherein uninterrupted dispensing of liquid beverages is provided.

Still another object of the invention is the provision of a common cooling chamber having a series of sealed passages passing therethrough to dispensing faucets and having their inlet ends connected to storage kegs which in turn are filled from feeding chambers which in normal operation may be detached, refilled and attached to the system to insure an uninterrupted beverage supply.

A still further object of the invention is the provision of a beverage dispensing apparatus having a plurality of feeding vessels of glass which may be attached to or detached at will from respective storage vessels in the shape of kegs, the feeding vessels each having a vent to supply air to the feeding vessel, there being a passage from the chamber of each storage vessel to a faucet where the beverage is dispensed, the passages being exposed to the cooling action of a cooling chamber.

Another and still further object of the invention is the provision of an apparatus which will provide various beverages either cooled or at room temperature.

Other and further objects will be apparent to those skilled in the art from a reading of the complete specification and claims.

Referring to the drawings wherein is illustrated an embodiment of the invention.

Fig. 5 is a half horizontal sectional view taken on the line 5—5 of Fig. 2.

Fig. 6 is a vertical sectional view of the cooling device and chamber.

Fig. 7 is a detail sectional view taken on the line 7—7 of Fig. 5.

Fig. 8 is a detail view taken on the line 8—8 of Fig. 5 and showing the tube and beverage passage partly in section.

Fig. 9 is a detail enlarged view showing the resilient brace or holding means for securing the feeding jar or vessel in its operative position.

Similar reference characters refer to the same or similar parts throughout the specification and drawings.

Figure 1:
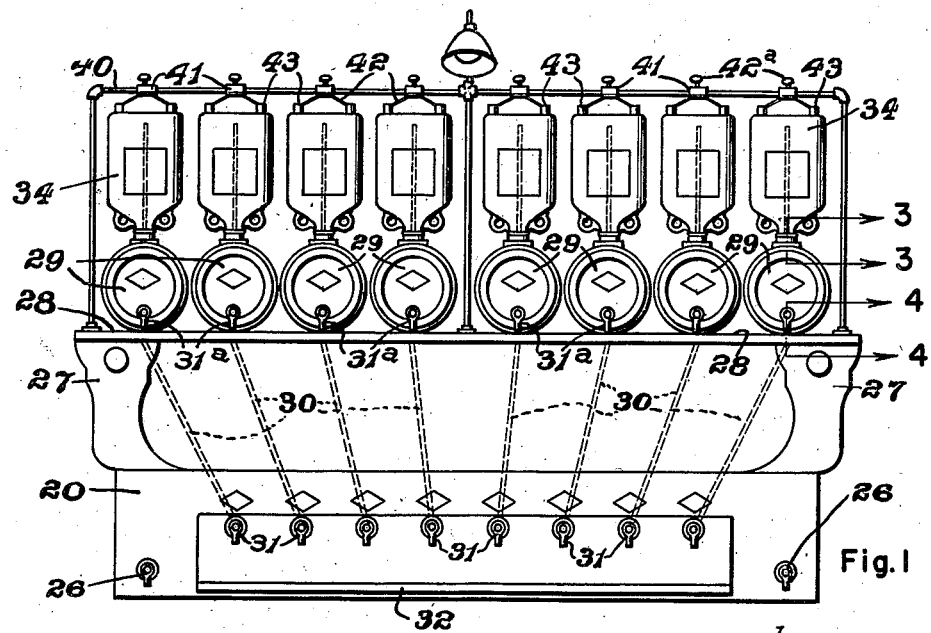
Fig. 1 is a front elevation of the invention.
Figure 3:
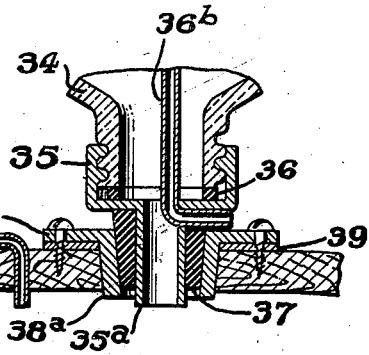
Fig. 3 is a sectional view taken on the line 3—3 of Fig. 1.
Figure 2:
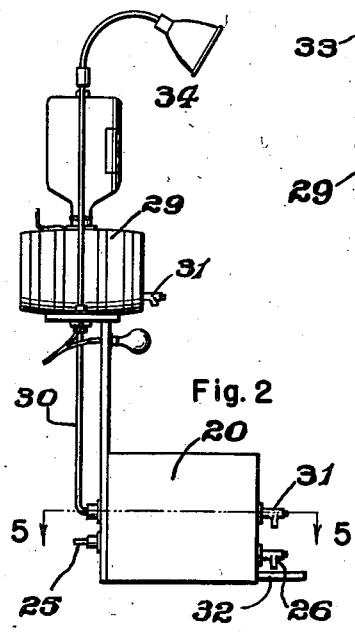
Fig. 2 is a side elevation.

In the drawings, 20 designates the outer wooden panel structure of the cooling chamber 21. Next to this outer wall 20 is an insulation means which may be of any suitable substance such as cork. This insulation means I have designated 22. Within the chamber, there is provided a suitable metallic lining as the wall 23 which may be of galvanized iron or sheet copper or any other suitable material.

The cooling chamber is provided with a cooling medium which may be of any suitable type. Ice may be placed within the chamber by removing the chamber cover 24 as illustrated in Fig. 6. If desired, suitable cooling coils 25 may be provided and connected to a refrigerating plant (not illustrated) in a well known manner. In practice, either the cooling coils 25 or the ice or both may be used in cooling the chamber 21. Suitable drain means as the drain faucet 26 may be provided at one or both ends of the chamber 21 as illustrated in Figures 1, 2, 5 and 6.

Supported adjacent to and preferably above the cooling chamber is a frame 27 having a rack or platform 28 for supporting the storage and feeding vessels.

Arranged along the platform are a series of wooden storage chambers, preferably in the form of barrels or kegs 29. These kegs 29 are provided with outlet passages as in the beverage delivery and cooling pipes 30 which are connected to the lower portions of the respective kegs 29 and extend through the cooling chamber 21 to outlet faucets 31.

As the beverage passes through the pipe 30, it becomes exposed to the action of the cooling medium within the chamber 21 and is cool by the time it reaches the faucet 31. As the details of construction and operation of the faucet 31 are not a part of this invention per se, the detailed construction of the faucet will not be described. Another faucet 31ᵃ is provided directly on the keg 29 for use when the beverage is desired uncooled or at room temperature. The details of construction of the faucet 31ª are similar to those of the faucet 31.

There is provided below the faucets 31, a drip tray 32 which is provided with the usual and well known drain (not illustrated).

If desired, a vent pipe 33 for the keg may be provided to permit the escape of air from the keg when it is being filled.

The filling vessel is provided to refill the keg after it has been emptied or nearly emptied. This refilling vessel preferably has a translucent portion and is illustrated as being a glass bottle 34 of suitable size and shape. The bottle preferably has a threaded opening to which is attached a cap 35 similarly threaded. The cap 35 has an opening to which is integrally attached a tubular outlet 35ª, as of block tin. The joint between the cap 35 and the filling vessel 34 is made tight by the gasket 36.

Installed in the cap 35 is a vent tube 36ᵇ which is illustrated as being right angular in shape and has one end extending out into the air with its opening adjacent the main body of the cap. The other end of the tube extends to the opposite end of the bottle to discharge the air above the surface of the beverage when the keg is being filled.

In order to seal the tubular outlet 35ª in the top of the keg during the refilling operation, a hard rubber cushion 37 is provided and fits the inside surface of a metal holder 38 which is secured in the top of the keg 29. This holder 38 provides for the support of the filling vessel 34 when the latter is in place. A pad 39 seals the joint between the metal holder 38 and the keg 29. A portion 38ª of the metal holder 38, extends into the interior of the keg 29 to provide space for the tubular outlet 35ª and its discharge of the beverage into the interior of the keg 29.

Supported by the platform 28 is a frame 40 which has a bar extending the length of the row of filling vessels 34. Slidably mounted on this horizontal bar portion of the frame 40 are slides 41 which have thumb screws 42ª for securing the respective slides 41 at any desired places. To each slide 41 is secured a leaf spring having its two ends 42 free to resiliently move. At the ends of these springs are located hard rubber cushions 43 for contact with the filling vessels 34 as illustrated in Fig. 1, when the latter are in place.

Figure 4:
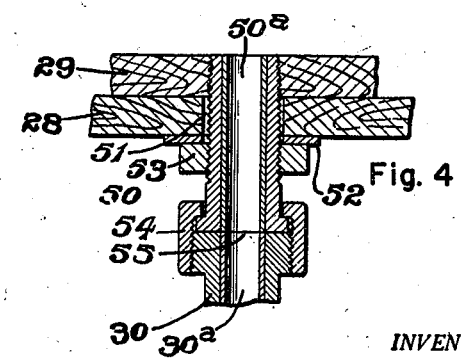
Fig. 4 is a sectional view taken on the line 4—4 of Fig. 1.

Referring particularly to Fig. 4, the outlet from the keg or storage chamber will now be described. A threaded pipe fitting 50 is screwed into the wall of the keg 29 after freely passing through an opening 51 in the platform or rack 28. A suitable washer 52 lies against the under side of the rack and the assembled parts are held relatively rigid by the nut 53 which is threadedly connected to the fitting 50. A block tin lining 50ª may be provided within the fitting 50 to protect the fitting 50 and the beverage from chemical action. At the end of the fitting 50 and the upper end of the pipe 30 is a union 54 of a well known type and which is provided with a thin washer 55 to make a tight joint.

If desired, the pipe 30 may be provided with a block tin lining 30ª to protect the pipe 30 and the beverage against chemical action.

Referring particularly to Fig. 7, there is illustrated the connections and fittings for extending the pipe 30 through the rear wall of the cooling chamber. A flanged fitting 56 passes through the metallic lining 23, the insulation 22 and the outer panel board 20. It is held in place by the washer 57 and the nut 58, the latter being screw threaded to the fitting. A lining 56ª as of block tin may be provided for the fitting to provide against chemical action. Unions 59 and 60 are provided to connect the sections of the pipe 30 together.

In using this apparatus the kegs are filled with their respective beverages by means of the filling vessels. As the tubular outlet 35ª of the filling vessel is inserted in its place, the liquid will flow from the filling vessel into the keg. If desired, the finger may be held over the lower side opening of the vent tube 36ᵇ to assist in keeping out the air until the bottle is in place. The beverage now passes from the filling vessel as the bottle 34 into the keg to pass through the pipe 30 to the faucet 31 or the faucet 31ª depending upon whether or not the beverage is desired to be cooled. If drawn from the faucet 31 it will be cooled and if drawn from the faucet 31ª, it will be delivered at the temperature within the storage chamber of the keg 29. In this way, the customer's wishes are instantly carried out by having available the beverage either cooled or at the room temperature.

It will be noted that in this way, the wine or other beverage is always kept in the wooden container.

The illustrated form of the invention provides for dispersing eight beverages. This, obviously could be increased or decreased as desired.

In transport, the gallon bottle or feeder vessel would be provided with a different type cap—one which would close the top completely.

While I have illustrated and described in detail an embodiment of my invention, it is to be understood that the disclosure is merely illustrative, and that modifications and changes may be made without departing from the spirit of the invention and within its scope as claimed.

Having described my invention, what I claim is:

1. Beverage dispensing apparatus comprising, in combination: a wooden keg; a glass vessel; a cap hermetically sealed on said vessel, provided with means to form a hermetical seal in the bung hole of the keg and to form the sole support of the weight of the vessel and contents; said cap of a length to extend substantially flush with the inner surface of the keg about the bung hole; a vent pipe opening through the surface of the cap laterally thereof close to the neck of the vessel and extending within the vessel close to the bottom thereof, whereby the contents of the vessel will flow into the keg to completely fill the same.

2. The combination of claim 1 with a vent pipe projecting from the interior of the upper surface of the keg to a point above the inverted neck of the glass vessel.

3. A beverage dispensing apparatus comprising in combination, a common refrigerant tank, a support thereabove and connected to the tank, a shelf on the support, a plurality of wooden kegs on the support, a pipe connected to the interior of each of the kegs and extending into and through the refrigerant tank, a faucet on the end of each pipe, a translucent refilling reservoir above each keg and having a sealed connection to the top of its keg, the contents of the refilling reservoir being substantially all in view, the outlet from the reservoir being adjacent the top of the keg.

GEORGE V. MARIANI.